United States Patent Office 3,130,121
Patented Apr. 21, 1964

3,130,121
INSECTICIDAL POWDER
Arthur Rapport, Glencoe, Ill., assignor to Leeco Chemical Company Division of Leeco Gas and Oil Co., Miami Beach, Fla., a corporation of Florida
No Drawing. Filed Feb. 10, 1961, Ser. No. 88,247
5 Claims. (Cl. 167—24)

This invention relates to an insecticidal composition, and more particularly, to an insecticidal powder, and a method of preparing the same with novel and desirable characteristics.

Besides having the ability to kill insects, a good insecticide should have persisting lethal effects. Many compositions have excellent lethal qualities, but are unsuitable, or capable only of limited use, as insecticides because their effectiveness lasts for only a short time. Other insecticides may be active for a longer time in some environments, but are quickly destroyed in others. Evaporation, oxidation, chemical reactions stimulated by exposure to ultra-violet or other radiant energy, as well as other influences, may be responsible for the loss of effectiveness.

It is an object of this invention to provide insecticidal compositions, the lethal effects of which persist for unusually long periods.

It is another object of this invention to provide a composition in which an insecticidally active ingredient is shielded from deleterious influences.

The objects of this invention are accomplished or attained by the provision and production of a novel insecticidal powder including a shielded insecticide the lethal qualities of which are retained and prolonged for a substantial period of time. According to this invention, that insecticidal powder comprises as the insecticide allethrin, cyclethrin, cinerin I, cinerin II, pyrethrin, a mixture of pyrethrins, 2-oxocyclopentenyl esters of chrysanthemumic acid or other insecticide which is deleteriously affected by exposure to conditions encountered in use. The insecticide of the novel powder is combined with arabic or tragacanth gum, dextrin, hydrolyzed starch, gelatin, or other shielding substance which is glutinous when moist but hardens on drying and is either soluble in water or swells up therein.

The insecticide and shielding substance of the powder, preferably are combined in the proportions of from about 0.02 percent to about 15% by weight of the insecticide and from about 99.98 percent to about 85% by weight of the shielding substance and each particle of that powder comprises an envelope of the shielding substance enclosing the insecticide.

The compositions of this invention are produced by dispersing the insecticide in a liquid carrier containing the shielding substance, subdivding the resultant dispersion as droplets, and solidifying those droplets. The term "dispersion" as employed herein and in the appended claims is defined to include true solutions, emulsions, suspensions, and other homogeneous distributions in a liquid carrier. Additional ingredients may be employed in the liquid carrier, such as solvents for the shielding substance, solvents for the insecticide, emulsifiers, and others when such are desired.

Although the structure of the compositions of this invention has not been definitely established, it appears from analysis and visual inspection that when compounded in accordance with the invention, they comprise the insecticide which is encapsulated in an envelope of the shielding substance. The protective capsule retards evaporation and shields the insecticide from deleterious influences of oxygen, ultra-violet rays, and general weathering, but the insecticide ingredient is available at substantially full effectiveness when the capsule is disturbed by an insect.

The product is a finely divided powder consisting of individual particles, each of which is a composition of shielding substance and insecticide that was formed by the solidification of a small droplet of suspension. In this respect, the novel product of the present invention differs from other forms of powdered insecticide which are formed by grinding blends of insecticide and solid extender or by impregnating a solid extender with an insecticide or a solution containing insecticide. The shielding substance, as employed in this invention, is not merely an extender since the properties of the composition of the present invention are radically different from those of insecticides that are extended with an inert powdered solid. In the compositions of this invention the shielding substance does not exert an influence simply by being present, but by being present in a particular relationship to the insecticide, namely by enveloping it.

Following are a group of examples which are presented to demonstrate the effectiveness of exemplary compositions within the scope of this invention. In the examples, the insecticidal effects were observed on houseflies of the *Musca domestica* species which were reared by the Peet-Grady method. The flies used were between four and five days old. The results reported were obtained by introducing the indicated insecticidal composition into a Petri dish 3.5 inches in diameter and thereafter placing twenty flies into the dish. At the end of one hour, the percent of flies that were immobilized, reported as the percent of knockdown, was noted and, after the one hour period, all flies were removed from the dish and transferred to a clean one containing food in the form of a swab of cotton saturated with sugar solution. The flies in the clean dish were observed for 24 hours after which the percent dead were noted and reported as the percent kill. All of the results designated "blank" were obtained in exactly the same manner, except that an empty dish was used instead of one containing an insecticidal composition. After the insecticide was introduced into the dish, it remained uncovered and exposed to weathering, including air and direct sunlight, for the entire indicated period of time designated "age of insecticide."

It should be understood that many of the results reported were obtained for the purpose of comparative evaluation of insecticidal compositions rather than merely killing insects and, as such, the duration of exposure of an insect, or the concentration of an insecticidal composition was, in those cases, intentionally diminished to a point where there would be some survivors so that comparisons of effectiveness of different compositions could be made. The fact that there were survivors in those cases is significant only in comparing one insecticide with another, and it does not indicate that an insecticidal composition is ineffective because some insects survive after exposure to it. Under different conditions in which insects are subjected to longer exposure or stronger concentrations, all of the compositions of this invention are effective. It may also be noted that some mortality occurs even in the "blanks" and that insecticidal compositions that have less than 100% efficiency after a given period of time will have 100% efficiency again after more time has elapsed. It must be recognized that the reported results are observations of individual living insects that have their own personal characteristics, and that in any group of such insects, apparent discrepancies may be due to the presence of a particularly hardy individual within the group or one that is influenced by uncontrolled conditions, such as disease or congenital weakness. Therefore small discrepancies in the examples should not be construed as anything other than the manifestations of individual characteristics, and the invention should be evaluated by the clearly evident trends apparent from the reported results.

EXAMPLE 1

Example 1 is presented only to establish a basis for comparison from which the invention can be demonstrated. Example 1 shows the characteristics of an insecticide which is not encapsulated in accordance with this invention and, therefore, indicates its limited period of effectiveness as presently used. The insecticide employed was a mixture of pyrethrin I and pyrethrin II. It was employed both as a powder and in acetone solution in such manner that the acetone evaporated and left a residue of the insecticide in the bottom of the dish before the insects were placed in the dish. The acetone solution was made by placing 200 mg. of the pyrethrins in a graduate and adding acetone to make up the solution to 100 ml. Enough of this solution was placed in a dish to leave a residue, upon evaporation of acetone, of the indicated quantity of insecticide.

Table 1

| Age of Insecticide (Days) | Concentration | | Percent Knock-down in 1 Hour | Percent Kill in 24 Hours |
|---|---|---|---|---|
| | Milligrams of Pyrethrins | Milligrams of Pyrethrins per Sq. ft. of Area | | |
| 1 | 0.02 | 0.3 | 30 | 35 |
| 3 | 0.02 | 0.3 | 30 | 0 |
| 10 | 0.02 | 0.3 | 0 | 0 |
| 1 | 0.2 | 3.0 | 95 | 40 |
| 3 | 0.2 | 3.0 | 100 | 0 |
| 10 | 0.2 | 3.0 | 0 | 0 |
| 1 | 2.0 | 30 | 100 | 100 |
| 3 | 2.0 | 30 | 100 | 95 |
| 10 | 2.0 | 30 | 0 | 0 |
| 1 | Blank | | 0 | 0 |

The results reported in Table 1 illustrate that although pyrethrins are highly lethal insecticides, exposure to air and light diminishes their effectiveness within three days and completely destroys the effectiveness of even the highest concentrations in ten days.

To compare the effect of a material suitable as a shielding substance but employed only as an extender, a composition was made by slurrying 100 grams of dextrin and 200 mg. of pyrethrins in a pentane carrier. When the volatile liquid evaporated, there resulted a dry powder which consisted of the dextrin on which the pyrethrins were adsorbed. This powder which is representative of ordinary powdered insecticide made in accordance with prior methods, was ground to a fine state of subdivision and placed in a Petri dish exposed to light and air. After 24 hours of exposure, 20 flies were placed in the dish for one hour and then removed to a clean dish. As a result of this exposure there was 0% knockdown and 0% kill within 24 hours.

EXAMPLE 2

Example 2 is presented to illustrate the tremendous increase in the duration of effectiveness that results from employing an insecticide in the compositions of this invention. In Example 2 an insecticidal composition embodying this invention, which comprises a mixture of pyrethrins such as used in Example 1 but encapsulated in dextrin, was employed. This composition was prepared by heating a weighed quantity of water as a carrier to 95°–100° C. One-half of that weight of dextrin was slowly added to the heated carrier and continuous mixing and heating were maintained for fifteen minutes after thickening of the blend began. To this dextrin-water dispersion approximately 3% by weight of a 20% solution of pyrethrins in a petroleum distillate was added and homogenized in a highspeed mixer. Following complete homogenization, the liquid was spray dried at a temperature of 80°–90° C. and the resultant dried material, which was a fine, powdery solid, was recovered from the bottom of the spray dryer. One hundred milligrams of this powder, which contained 1.8 milligrams of pyrethrins was placed in an open dish exposed to air, sunlight and all other existing conditions. This amounted to a concentration of 27 mg. of pyrethrins per square foot of area. Approximately once each week, twenty flies were placed in the dish for one hour and then removed to a clean dish containing food as hereinabove described. The observations of the behavior of these flies is reported in Table 2.

Table 2

| Age of Insecticide (Days) | Percent Knock-down in 1 hour | Percent Kill in 24 hours |
|---|---|---|
| 7 | 100 | 100 |
| 14 | 100 | 100 |
| 21 | 100 | 100 |
| 28 | 100 | 100 |
| 35 | 100 | 100 |
| 49 | 100 | 100 |
| 61 | 100 | 100 |
| 70 | 100 | 95 |

A blank dish was employed concurrently with each of the above and, although the range of results from the various blanks was from 0% to 5% knock-down and from 0% to 15% kill, in almost every case the blanks resulted in no knock-down and no kill.

EXAMPLE 3

The results from the composition reported as Example 2 were so strikingly effective, that substantially smaller quantities of the expensive pyrethrins were employed. Thus, another insecticidal composition was made in the same manner as described above, only one-tenth as much pyrethrins, were added to the dextrin-carrier suspension. Again, 100 mg. of this material, which now contained 0.18 mg. pyrethrins, or 2.7 mg. of pyrethrins per square foot of area, was placed in a dish and approximately once each week twenty flies were exposed to it for an hour. Between uses, the dish was uncovered and exposed. Observations of the flies' behavior are reported in Table 3.

Table 3

| Age of Insecticide (Days) | Percent Knock-down in 1 hour | Percent Kill in 24 hours |
|---|---|---|
| 7 | 100 | 75 |
| 14 | 100 | 100 |
| 21 | 100 | 100 |
| 28 | 100 | 70 |
| 49 | 100 | 100 |
| 61 | 95 | 55 |
| 70 | 75 | 15 |

Table 3 shows that even in concentrations as low as 0.18% pyrethrins spread as thinly as 2.7 mg. per square foot of area, the insecticidal effect is still substantial for seventy days. It is thus evident that, if a killing concentration of insecticide is encapsulated in a shielding substance in accordance with this invention, that killing concentration has its effectiveness preserved for an extremely extended period of time, and it is both available to kill insects and insecticidally active at all times during that extended period.

EXAMPLE 4

Example 4 is presented to illustrate that the effectiveness of an insecticide is not diminished by the presence of the shielding substance. Table 4 reports observations of the behavior of flies placed in five different dishes, each containing a pyrethrin-dextrin composition prepared in accordance with this invention to have from 1.8% to 0.18% by weight pyrethrins. Enough composition was used in each case to supply the indicated concentration of pyrethrins. The last two items in Table 4 report results obtained using even further diminished concentrations. All dishes were left open and exposed throughout the indicated period.

Table 4

| Age of Insecticide (Days) | Concentration of Insecticide | | Percent Knockdown in 1 Hour | Percent Kill in 24 Hours |
|---|---|---|---|---|
| | Mg. of Pyrethrin Per Sq. Ft. | Total Mg. of Pyrethrins | | |
| 1 | 15.0 | 1.0 | 100 | 100 |
| 1 | 7.5 | 0.5 | 100 | 100 |
| 1 | 3.0 | 0.2 | 100 | 95 |
| 1 | 1.5 | 0.1 | 100 | 75 |
| 1 | 0.75 | 0.05 | 100 | 45 |
| 7 | 15.0 | 1.0 | 100 | 100 |
| 7 | 7.5 | 0.5 | 100 | 100 |
| 7 | 3.0 | 0.2 | 100 | 55 |
| 7 | 1.5 | 0.1 | 100 | 35 |
| 7 | 0.75 | 0.05 | 100 | 35 |
| 14 | 15.0 | 1.0 | 100 | 100 |
| 14 | 7.5 | 0.5 | 100 | 100 |
| 14 | 3.0 | 0.3 | 100 | 90 |
| 14 | 1.5 | 0.1 | 100 | 65 |
| 14 | 0.75 | 0.05 | 100 | 55 |
| 21 | 15.0 | 1.0 | 100 | 100 |
| 21 | 7.5 | 0.5 | 100 | 100 |
| 21 | 3.0 | 0.2 | 100 | 100 |
| 21 | 1.5 | 0.1 | 100 | 70 |
| 21 | 0.75 | 0.05 | 100 | 55 |
| 26 | 15.0 | 1.0 | 100 | 100 |
| 26 | 7.5 | 0.5 | 100 | 100 |
| 26 | 3.0 | 0.2 | 100 | 80 |
| 26 | 1.5 | 0.1 | 100 | 45 |
| 26 | 0.75 | 0.05 | 100 | 10 |
| 33 | 15.0 | 1.0 | 100 | 100 |
| 33 | 7.5 | 0.5 | 100 | 100 |
| 33 | 3.0 | 0.2 | 100 | 55 |
| 33 | 1.5 | 0.1 | 100 | 35 |
| 33 | 0.75 | 0.05 | 95 | 20 |
| 5 | 0.6 | 0.04 | 100 | 5 |
| 5 | 0.3 | 0.02 | 90 | 5 |

The data presented in the foregoing Table 4 illustrate that as little as 0.02 mg. of an insecticide distributed as thin as 0.3 mg. per square foot of area, when encapsulated in dextrin, is still effective and that extremely small quantities, in the neighborhood of tenths of a milligram per square foot, are effective for periods of over a month. It is evident from the observations reported in Table 4 that the encapsulating or shielding material, although protecting the insecticide from destructive influences, causes no diminishment of its insecticidal effect and even appears to increase the insecticidal effect to the extent that small quantities of insecticide are effective when encapsulated, while larger quantities of that same insecticide, when employed alone, would soon deteriorate.

EXAMPLE 5

In all of the previous examples for purposes of comparison, all compositions were made in the same way and of the same materials. However, it is not intended that this invention be limited to compositions of pyrethrins encapsulated in dextrin, and it is the purpose of Example 5 to demonstrate that different insecticides may be employed as well as different shielding substances.

Table 5

| Age of Insecticide (Days) | Shielding Substance | Insecticide | Mg. of Insecticide | Percent Knockdown in 1 hour | Percent Kill in 24 hours |
|---|---|---|---|---|---|
| 3 | Gum Arabic | Pyrethrins | 1.8 | 100 | 100 |
| 3 | Gum Tragacanth | do | 1.8 | 100 | 100 |
| 3 | Nadex | do | 1.8 | 100 | 100 |
| 3 | do | Allethrin | 1.8 | 100 | 100 |

Nadex is a trademark of the National Starch Company used to identify a product consisting of a dextrinized starch.

The examples herein presented demonstrate that even the highly lethal pyrethrin insecticides have their effectiveness destroyed within a short period, that is, between one and ten days, when they are exposed to such destructive influences as sunlight, atmospheric oxygen and normal weathering. The examples clearly demonstrate that by the use of this invention these destructive effects, as well as others, of which we might not be aware, are prevented, and the lethal character of the insecticide is extended from a period of a few days to the surprisingly long period of several months.

The examples further show that the insecticide in these compositions is active when applied in concentrations as low as 0.3 mg. per square foot. It has been found that powdered insecticides made in accordance with this invention may contain as little as 0.02% by weight of insecticide and as much as a capsule will hold, usually about 15% by weight. The shielding substance comprises from 99.98% to about 85% by weight of the powder.

The examples also demonstrate that many shielding substances are operable and, although not necessarily yielding identical results with the same insect species and used in combination with the same insecticide, they are equivalent to each other. Similarly, many, if not all, insecticides that are encapsulated in accordance with the present invention, have their effectiveness preserved.

Having thus described this invention, what is claimed is:

1. A method of preparing a shielded insecticidal powder comprising forming a homogeneous dispersion of a dextrin shielding substance and a pyrethrin insecticide in a liquid carrier wherein said insecticide makes up from about 0.02% to about 15% by weight of the total of said shielding substance and said insecticide, subdividing said dispersion into small droplets, solidifying said droplets and recovering the resultant shielded insecticidal powder.

2. A method of preparing a shielded insecticidal powder comprising forming a homogeneous dispersion of a dextrin shielding substance in a water carrier subsequently homogeneously dispersing a pyrethrin insecticide in said carrier wherein said insecticide makes up from about 0.02% to about 15% by weight of the total of said shielding substance and said insecticide, subsequently subdividing said dispersion into small droplets, solidifying said droplets and recovering the resultant shielded insecticidal powder.

3. A method of preparing a shielded insecticidal powder comprising forming a homogeneous dispersion of a dextrin shielding substance in a water carrier, subsequently homogeneously dispersing a pyrethrin insecticide in said carrier wherein said insecticide makes up from about 0.02% to about 15% by weight of the total of said shielding substance and said insecticide, subsequently spray drying said carrier with the shielding substance and insecticide dispersed therein and recovering the resultant shielded insecticidal powder.

4. An insecticidal powder comprising from about 0.02% to about 15% by weight of a pyrethrin insecticide and from about 99.98% to about 85% by weight of a dextrin shielding substance, each particle of said powder comprising an envelope of said shielding substance enclosing said insecticide.

5. An insecticidal powder comprising solid, finely divided particles, each particle comprising a capsule of a dextrin shielding substance enclosing a pyrethrin insecticide, said insecticide forming from about 0.02% to about 15% by weight of said powder.

References Cited in the file of this patent
UNITED STATES PATENTS

| | | |
|---|---|---|
| 1,786,967 | Trevellian | Dec. 30, 1930 |
| 2,011,428 | Voorhees | Aug. 13, 1935 |
| 3,091,567 | Wurzburg | May 28, 1963 |

FOREIGN PATENTS

| | | |
|---|---|---|
| 4,654 | Great Britain | Apr. 8, 1899 |
| 10,188 | Great Britain | June 30, 1894 |
| 656,058 | Great Britain | Aug. 8, 1951 |

OTHER REFERENCES

Frear: Chemistry of Insecticides, Fungicides and Herbicides, 2nd ed., 1948, page 290.